(No Model.)
J. A. SWEETING.
COMBINED KNIFE AND SCOOP.
No. 605,209. Patented June 7, 1898.
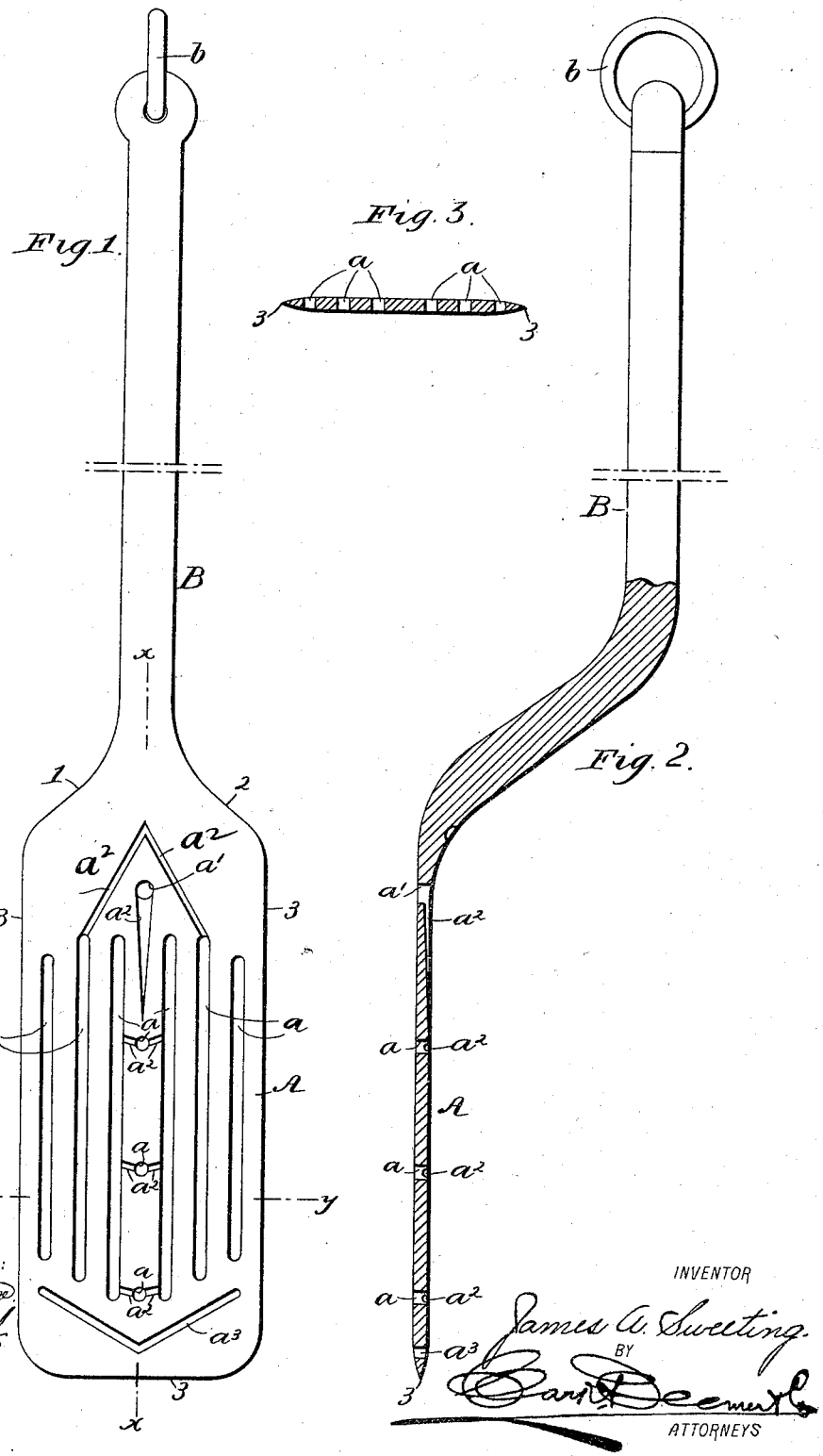

UNITED STATES PATENT OFFICE.

JAMES A. SWEETING, OF NEW YORK, N. Y., ASSIGNOR OF ONE-HALF TO JAMES A. CAMBRIDGE, OF SAME PLACE.

COMBINED KNIFE AND SCOOP.

SPECIFICATION forming part of Letters Patent No. 605,209, dated June 7, 1898.

Application filed June 1, 1897. Renewed May 9, 1898. Serial No. 680,232. (No model.)

*To all whom it may concern:*

Be it known that I, JAMES A. SWEETING, a citizen of the United States, and a resident of New York city, county of New York, and State of New York, have invented certain new and useful Improvements in a Combined Knife and Scoop, of which the following is a specification, reference being had to the accompanying drawings, forming a part thereof, in which similar letters and figures of reference indicate corresponding parts.

This invention relates to an improved culinary implement comprising the combined scoop and knife adapted for handling hot fish and other meats; and the object thereof is to provide a device of this character which will allow for the escape of drippings when the meat is being removed from the pan, while at the same time an effective knife is always at hand for trimming or cutting the meat after it is removed from the pan, whereby the labor of cooking and handling hot meats and preparing them for the table is facilitated.

The invention will be hereinafter fully described, and specifically set forth in the annexed claims.

In the accompanying drawings, forming part of this specification, Figure 1 is a front elevation of my improved device. Fig. 2 is a vertical sectional elevation thereof, taken on the line $xx$ of Fig. 1; and Fig. 3 is a sectional plan view taken on the line $y\ y$ of Fig. 1.

In the practice of my invention I provide, primarily, a plate A, having a series of vertical channels or slots $a$ extended therethrough, also a row of centrally-located apertures $a'$, having grooves $a^2$ leading thereto for the escape of drippings while the device is being used. Another aperture $a^3$ may also be extended through the outer end of the plate. This said plate is preferably rectangular in contour, and the four corners thereof are rounded, and extending all around the plate from the point 1 to the point 2 is a sharp edge 3, comprising a knife.

The upper end of the plate A is connected to or formed integrally with a handle B, which preferably has a ring $b$, secured to the outer end thereof as a means for hanging up the device when it is not in use.

In the operation and use of the device it is specially applicable for handling hot fried fish, the fish being removed from the pan by means of the scoop or plate A and the drippings allowed to escape through the medium of the apertures or slots leading through the said plate. Having placed the fish upon a suitable receptacle, the operator can then cut the same into pieces of desired size ready for serving, and this operation is applicable to any kind of fried meat.

Having thus described my invention, what I claim as new, and desire to secure by Letters Patent, is—

1. As a new article of manufacture, a kitchen implement comprising a thin flat metal plate adapted for use as a cutter having parallel longitudinal apertures in the central portion and an angular aperture in one end thereof, grooves on its upper surface leading to the said parallel apertures, a knife-edge surrounding the said plate and a projected handle, substantially as shown and described.

2. As a new article of manufacture, a culinary implement comprising a flat metallic plate having a knife-edge thereon and lateral and longitudinal and central apertures leading therethrough for the escape of drippings, surface grooves on one side communicating with the central and longitudinal apertures and a handle projected from one end, substantially as shown and described.

In testimony that I claim the foregoing as my invention I have signed my name, in presence of two witnesses, this 28th day of May, 1897.

JAMES A. SWEETING.

Witnesses:
C. SEDGWICK,
B. MCCOMB.